C. A. McCALLISTER.
NAUTICAL INSTRUMENT.
APPLICATION FILED OCT. 10, 1908.
938,780.
Patented Nov. 2, 1909.
2 SHEETS—SHEET 1.
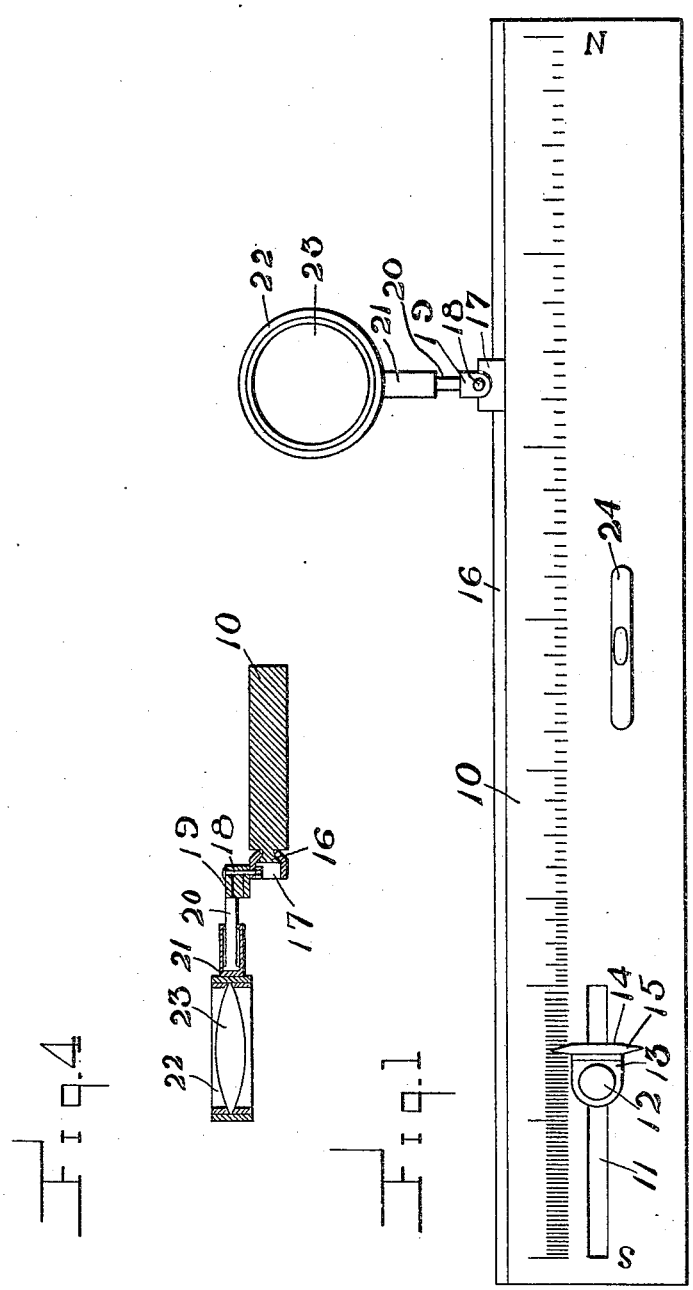
Witnesses
May Noel.
E. L. Chandler
Inventor
Clarence A. McCallister.
By Woodward & Chandler
Attorneys

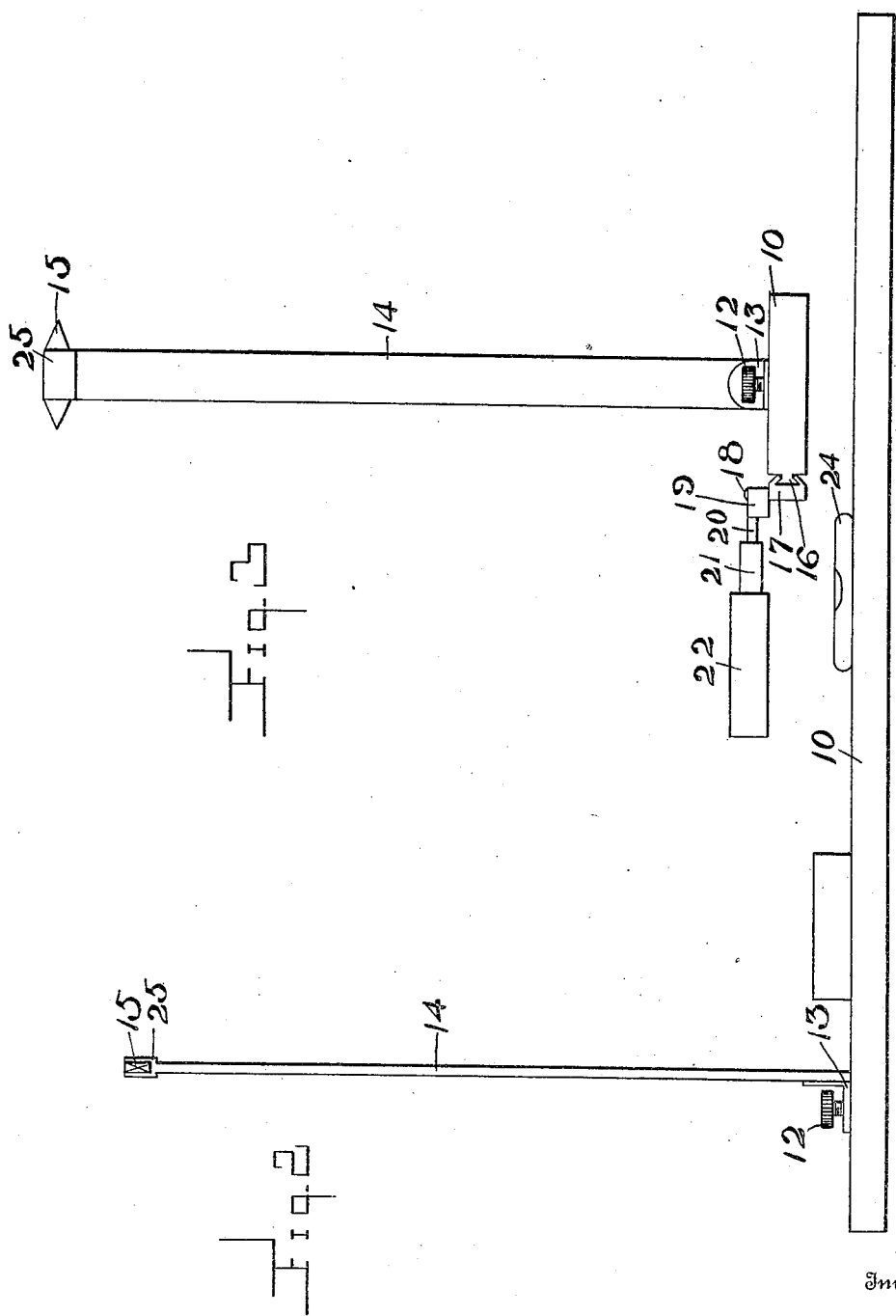

UNITED STATES PATENT OFFICE.

CLARENCE A. McCALLISTER, OF MARIETTA, WASHINGTON.

NAUTICAL INSTRUMENT.

938,780.  Specification of Letters Patent.  Patented Nov. 2, 1909.

Application filed October 10, 1908. Serial No. 457,134.

*To all whom it may concern:*

Be it known that I, CLARENCE A. MCCALLISTER, a citizen of the United States, residing at Marietta, in the county of Whatcom and State of Washington, have invented certain new and useful Improvements in Nautical Instruments, of which the following is a specification.

This invention relates to nautical instruments and has special reference to a device for indicating the latitude of a ship with the use of the sun's rays.

An object of this invention is to devise an instrument which can be employed for the determination of the degree of latitude in which a ship is sailing by the utilization of the sun's rays in casting a shadow.

The invention has for a further object the provision of an instrument of this character which is simple in construction and the number of its parts so that the same can be economically manufactured.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a top plan view of the instrument showing the scales marked on the same greatly enlarged, Fig. 2 is a side elevation of the instrument, Fig. 3 is an end elevation, Fig. 4 is a fragmentary view of the base showing the sliding attachment of the magnifying glass to enable the observer to read the scale more accurately.

Referring to the drawings 10 designates a base which comprises a strip of wood or of metal upon the upper face of which are disposed two scales, the longer of which denotes the degrees of latitude while the shorter one is divided into the number of days included between the longest day of the year and the shortest day of the year. The end of the base 10 which carries the scale of days of the year is designated as the south end of the instrument while the opposite end is the north end of the instrument for the purpose of correctly positioning the same when a reading is to be taken. The base 10 is provided at the south end with a central and longitudinally disposed slot 11 through which is engaged a set screw 12 which is carried by the angled portion 13 of the vertically disposed arm 14. The arm 14 is provided upon its upper extremity with a laterally disposed indicator 15 which extends slightly beyond the edges of the arm 14. The base 10 is provided upon one of its edges with a flanged guide 16 extending the entire length of the latitude scale upon which is mounted a slide 17 which is provided upon its upper edge with a stud 18 which engages through a sleeve 19. The sleeve 19 is provided with a circular laterally extending arm 20 which is loosely engaged in a sleeve 21 disposed upon the casing 22 which supports a magnifying glass 23. With this construction it is seen that the magnifying glass may be reciprocated longitudinally of the base 10 and may be swung into practically any desired angle. The glass 23 is employed for the purpose of reading accurately the exact degrees of latitude designated by the shadow.

The operation of the device is as follows: The base 10 is positioned directly north and south and the arm 14 is adjusted in the slot 11 to coincide with the division of the scale which designates the day on which the reading is taken. When the sun's rays are allowed to strike the instrument, which must be at noon of the day the reading is taken the arm 14 and indicator 15 cause a shadow to be thrown longitudinally upon the base 10 and the scale of latitude marked thereon. The indicator 15 throws a shadow which projects beyond the shadow of the arm 14 and enables the observer to locate the exact degrees of latitude upon the scale by the use of the magnifying glass 23. Although the smaller scale is divided into the days included between six months only still the divisions apply to the days which are included between the remaining six months of the year thus forming a device which is adaptable to use at any time.

The base 10 is provided with a spirit tube 24 which is placed centrally thereon for the purpose of determining the exact angle of the base 10. The upper extremity of the arm 14 is centrally depressed to form forked members 25 to support the indicator 15 a short distance above the upper extremity of the arm 14 for the purpose of more clearly defining the reading upon the scale.

It will be noted that the graduations on the scale of days increase in length of interval gradually from the south end to the north end in a ratio corresponding to the declination of the sun on the respective days.

What is claimed is:—

1. A device of the character described comprising a base having a scale of degrees of latitude marked thereon and a scale of the days of the year included between the longest and the shortest day, a vertically disposed arm adjustably secured at one end of said base adapted to be adjusted to the scale of days, an indicator disposed across the upper extremity of said arm and a set screw for adjustably securing said arm upon said base.

2. An instrument of the class described comprising a base, having a scale of degrees of latitude marked thereon and a scale of days disposed at one end thereof, a vertically disposed arm adjustably secured at one end of said base adjacent said scale of days and an indicator disposed across the upper extremity of said arm for projecting a shadow across the scale of degrees of latitude on said base.

3. In a device of the class described the combination with a base and a spirit level mounted in said base of a scale of latitude, a scale of days, said scales marked off on said base and an adjustable arm disposed in adjustable relation to said scale of days toward one end of said base.

4. A device of the character described comprising a base, a spirit level on said base, a scale of latitude on said base, a scale of days on said base, an arm upwardly extended and adjustably supported on said base in relation to said scale of days, forked arms formed upon the upper end of said arm and an indicator disposed across said forked arms.

In testimony whereof I affix my signature, in presence of two witnesses.

CLARENCE A. McCALLISTER.

Witnesses:
GEORGE A. HILL,
J. W. McCALLISTER.